United States Patent
Horng et al.

(10) Patent No.: US 6,897,586 B2
(45) Date of Patent: May 24, 2005

(54) AXIAL TUBE ASSEMBLY OF A MOTOR

(75) Inventors: Alex Horng, Kaohsiung (TW); Yin-Rong Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 71 days.

(21) Appl. No.: 10/624,563

(22) Filed: Jul. 23, 2003

(65) Prior Publication Data

US 2004/0239198 A1 Dec. 2, 2004

(30) Foreign Application Priority Data

May 27, 2003 (TW) .......................................... 92114295

(51) Int. Cl.⁷ ................................................ H02K 5/16
(52) U.S. Cl. ..................... 310/90; 310/67 R; 360/99.08
(58) Field of Search ................................ 310/67 R, 90, 310/91, 254; 360/99.04, 99.07, 99.08

(56) References Cited

U.S. PATENT DOCUMENTS 6,617,736 B1 * 9/2003 Horng et al. ................. 310/91
6,756,715 B2 * 6/2004 Hirose et al. ................. 310/90
6,815,852 B2 * 11/2004 Horng et al. ............. 310/67 R

* cited by examiner

Primary Examiner—Darren Schuberg
Assistant Examiner—Judson H. Jones
(74) Attorney, Agent, or Firm—Bacon & Thomas PLLC

(57) ABSTRACT

An axial tube assembly of a motor includes an axial tube around which a stator assembly is mounted, an engaging member, and a sleeve in which a bearing is mounted. The engaging member includes a base and a plurality of resilient legs projecting from the base. Each resilient leg has a hook on a distal end thereof. The base of the engaging member is engaged with and thus seals a bottom end of an axial hole of the axial tube. The sleeve is mounted in the engaging member and has a base portion. The hook of each resilient leg is pressed outward to thereby retain the stator assembly in place when the sleeve and the engaging member are received in the axial tube, with the resilient legs of the engaging member together holding the sleeve to thereby allow tight engagement between the sleeve and the bearing.

11 Claims, 6 Drawing Sheets

AXIAL TUBE ASSEMBLY OF A MOTOR

BACKGROUND OF THE INVENTION

1. Field of the Invention

The present invention relates to an axial tube assembly of a motor.

2. Description of Related Art

FIG. 1 illustrates a conventional axial tube assembly of a motor, and FIG. 2 is a sectional view of a motor with an axial tube assembly of FIG. 1. As illustrated in FIGS. 1 and 2, the motor includes a casing 1 with an axial tube 11 formed thereon. The axial tube 11 has an axial hole 11, wherein plural slots 112 are defined in a periphery delimiting the axial hole 111 and each include an open end 113. An engaging member 2 includes a ring-like base 21 and plural legs 22 projecting from a side of the base 21. The base 21 is engaged in an annular groove 114 in a bottom end of the axial tube 11, with the respective leg 22 being received in the respective slot 112 and with a hook 23 on a distal end of the respective leg 22 pressing against a side of a stator assembly 3 that is mounted around the axial tube 11. Plural protrusions 115 are formed on the inner periphery of the axial tube 11, with an upper bearing 4 mounted on tops of the protrusions 115, with a lower bearing 4 mounted to bottoms of the protrusions 115, and with a shaft 51 of a rotor 5 extending through the bearings 4.

The legs 22 of the engaging member 2 together hold the bearings 4 in place. Further, the respective leg 22 is pushed outward by the bearings 4, and the hook 23 of the respective leg 22 presses against the side of the stator assembly 3. Thus, the hooks 23 of the legs 22 retain the stator assembly 3 in place. As a result, the bearings 4 are retained in place by the legs 22 of the engaging member 2 such that the rotor 5 rotates about a fixed axis and that the whole stator assembly 3 is reliably fixed regardless of heat expansion/shrinkage of the axial tube 11 due to temperature change. However, the bearings 4 might not be in contact with the inner periphery delimiting the axial hole 111 of the axial tube 11, failing to provide a reliable assembly for the bearings 4. Further, in a case that the bearings 4 are oily bearings, the axial tube 11 and the engaging member 2 could not provide a sealed reservoir for the lubricating oil, resulting in loss of the lubricating oil of the bearings 4. Further, mounting of a retainer 52 to the shaft 51 of the rotor 5 that has been extended through the bearings 4 is difficult, as the space in the axial hole 111 of the axial tube 11 is relatively small. Further, dust is apt to enter the bearings 4 via a relatively large gap between the axial tube 11 and an end wall of the rotor 5.

OBJECTS OF THE INVENTION

An object of the present invention is to provide a motor with an axial tube assembly that provides the rotor with reliable assembly and rotational stability.

Another object of the present invention is to provide a motor with an axial tube assembly that avoids entrance of dust into the bearing of the motor, thereby prolonging the life of the bearing.

A further object of the present invention is to provide a motor with an axial tube assembly that provides a reservoir for the lubricating oil, preventing leakage of the lubricating oil and thus prolonging the life of the bearing.

Still another object of the present invention is to provide a motor with an axial tube assembly that simplifies the assembling procedure.

SUMMARY OF THE INVENTION

To achieve the aforementioned objects, the present invention provides an axial tube assembly including an axial tube, an engaging member, and a sleeve. The axial tube includes an axial hole, and a stator assembly is mounted around the axial tube. The engaging member includes a base and a plurality of resilient legs projecting from the base. Each resilient leg has a hook on a distal end thereof. The base of the engaging member is engaged with and thus seals a bottom end of the axial hole of the axial tube. The sleeve is mounted in the engaging member and has a base portion, and a bearing is mounted in the sleeve.

The hook of each resilient leg of the engaging member is pressed outward to thereby retain the stator assembly in place when the sleeve and the engaging member are received in the axial tube, with the resilient legs of the engaging member together holding the sleeve to thereby allow tight engagement between the sleeve and the bearing.

In an embodiment of the invention, the axial tube includes a plurality of grooves in an inner periphery delimiting the axial hole. The resilient legs of engaging member are respectively positioned in the grooves of the axial tube.

The sleeve further includes a plurality of blocks. Each two adjacent resilient legs of the engaging member have a gap therebetween. Each block of the sleeve is positioned in a respective gap, thereby preventing relative rotation between the sleeve and the engaging member.

The sleeve has an upper end extending to a position adjacent to an end wall of a rotor, preventing entrance of dust via a gap between the end wall of the rotor and the upper end of the sleeve.

The axial tube further includes a plurality of positioning grooves in a bottom end delimiting the axial hole. The base portion of the engaging member further includes a plurality of positioning blocks for engaging with the positioning grooves of the axial tube.

The axial tube further includes a plurality of protrusions on an upper end of an inner periphery delimiting the axial hole for preventing the sleeve from disengaging from the axial tube.

The sleeve includes a plurality of pairs of ribs on an outer periphery thereof. Each protrusion of the axial tube is sandwiched between a respective pair of said ribs of said sleeve.

A retainer is sandwiched between the base portion of the sleeve and the base of the engaging member, thereby positioning a shaft of a rotor that extends through the bearing.

The base of the engaging member includes a stepped portion on an upper end thereof, and the retainer is positioned on the stepped portion.

The bearing may be an oily bearing, a self-lubricating bearing, a copper bearing, or a sintered bearing. The bearing may further include a plurality of oil channels in an outer periphery thereof, allowing circulation of the lubricating oil.

Other objects, advantages and novel features of this invention will become more apparent from the following detailed description when taken in conjunction with the accompanying drawings.

DETAILED DESCRIPTION OF THE PREFERRED EMBODIMENT

Figure 1:
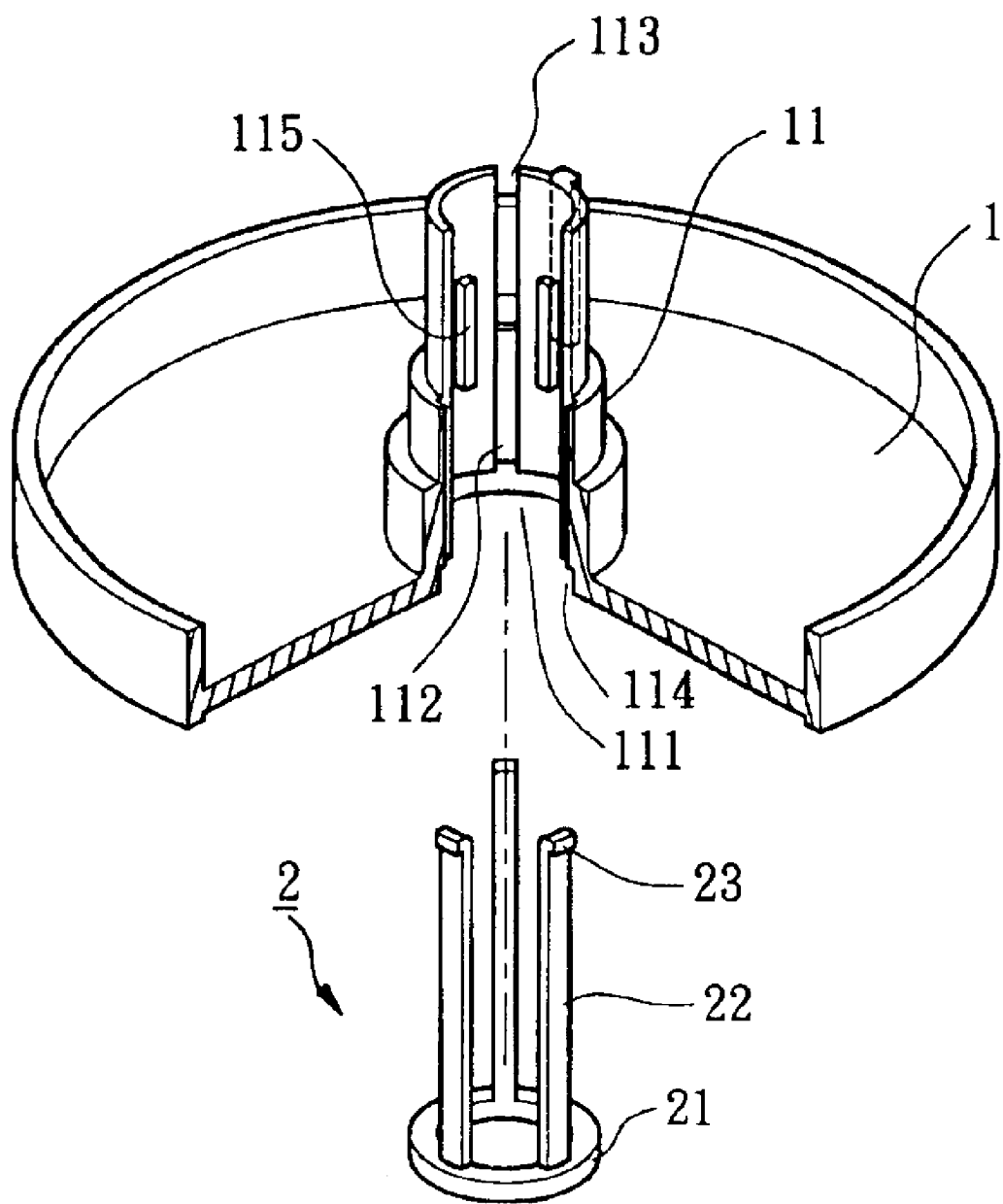
FIG. 1 is an exploded perspective view of an axial tube assembly of a motor.
Figure 2:
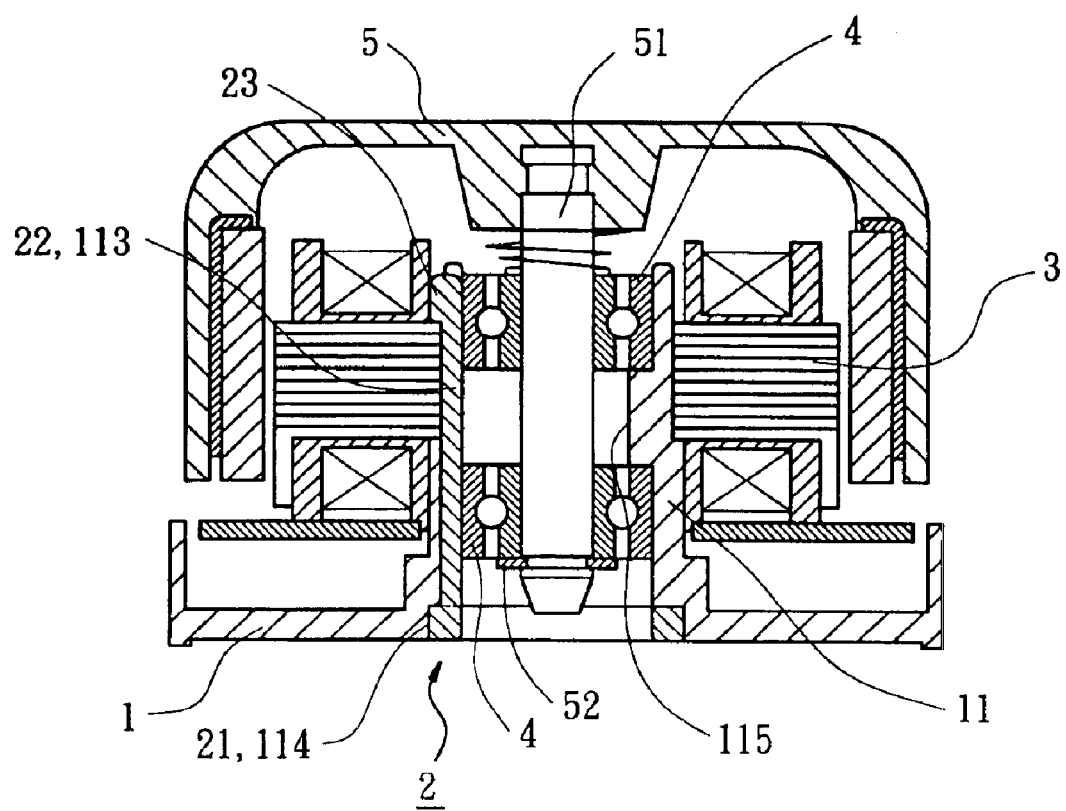
FIG. 2 is a sectional view of a motor with an axial tube assembly of FIG. 1.
Figure 3:
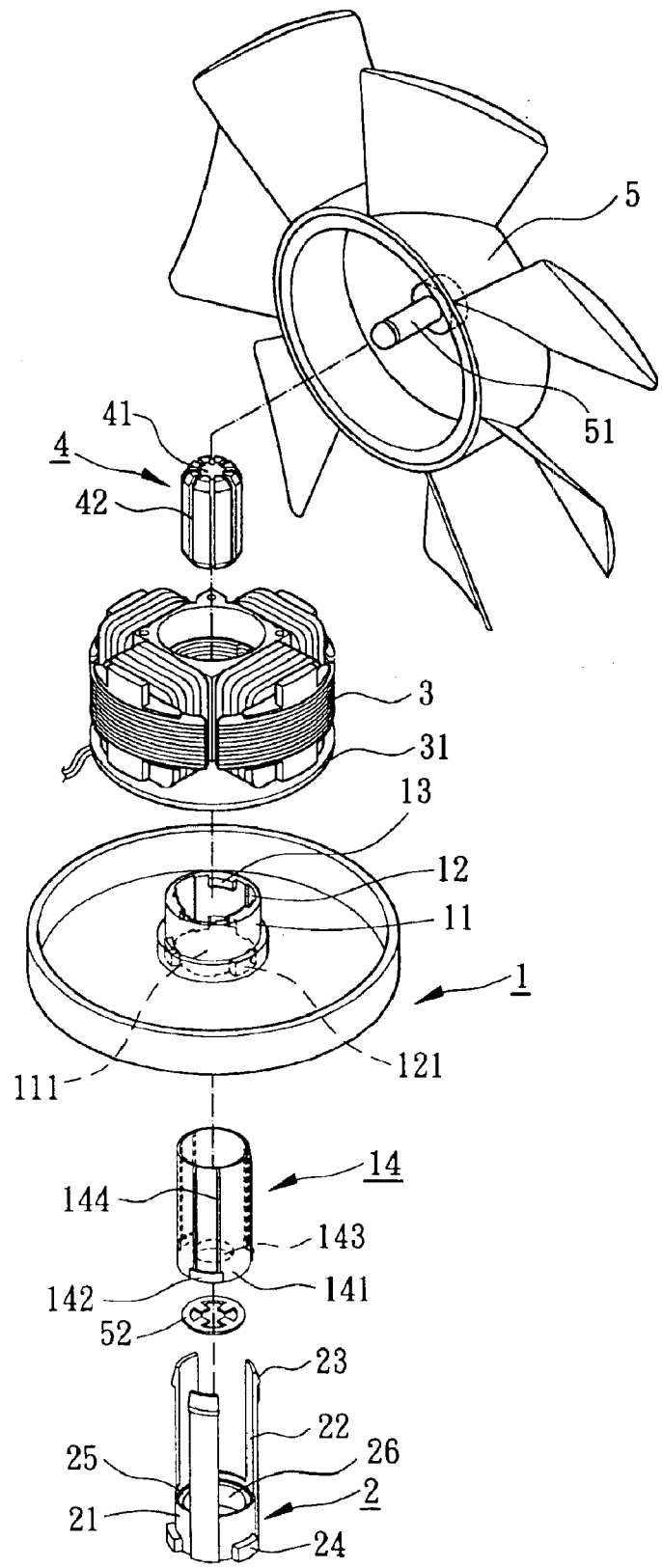
FIG. 3 is an exploded perspective view of a motor with an axial tube assembly in accordance with the present invention.

A preferred embodiment of the present invention is now to be described hereinafter in detail, in which the same reference numerals are used in the preferred embodiments for the same parts as those in the prior art to avoid redundant description.

Referring to FIGS. 3 through 7, a motor in accordance with the present invention comprises a casing 1, a stator assembly 3, a bearing 4, and an axial tube assembly. In this embodiment, the axial tube assembly includes an axial tube 11, an engaging member 2, and a sleeve 14. The axial tube 11 is generally integrally formed on a central portion of the casing 1 and made of plastic. An outer periphery of the axial tube 11 may be smooth or configured to have a stepped portion for mounting the stator assembly 3 and a circuit board 31 of various dimensions. The axial tube 11 has an axial hole 111, with a plurality of grooves 12 being defined in an inner periphery delimiting the axial hole 111, with a plurality of positioning grooves 112 being defined in the inner periphery delimiting the axial hole 111, and with a plurality of protrusions 13 being formed on the inner periphery delimiting the axial hole 111. Preferably, the grooves 12 are spaced at regular angular intervals, and the positioning grooves 121 are defined in a bottom wall delimiting the axial hole 111 and not aligned with the respective grooves 12. Further, the protrusions 13 are preferably formed on an upper end of the inner periphery delimiting the axial hole 111 and neither aligned with the respective grooves 12 nor aligned with the respective positioning grooves 121. In this embodiment, the numbers of the grooves 12, the positioning grooves 121, and the protrusions 13 are all three (3).

The engaging member 2 is preferably made of plastic and extended through the axial hole 111 of the axial tube 11. The engaging member 2 includes a base 21 and a plurality of resilient legs 22 each projecting from the base 21 and having a hook 23. A plurality of positioning blocks 24 are formed on the base 21 and extend radially outward. The positioning blocks 24 are respectively engaged in the positioning grooves 121 of the axial tube 11 for tightly sealing a bottom of the axial tube 11. The base 21 includes a stepped portion 25 and a reservoir 26. A retainer 52 is mounted to the stepped portion 25. The reservoir 26 serves as a chamber for storage of the lubricating oil and avoids leakage of the lubricating oil. The respective leg 22 extends upward from a periphery of the base 21 and is engaged in the respective groove 12 of the axial tube 11. The respective hook 23 extends radially outward from a distal end of the respective leg 22. The numbers of the legs 22, the hooks 23, and the positioning blocks 24 are preferably three (3).

In this embodiment, the sleeve 14 is a cylindrical member having a base portion 141, a plurality of blocks 142 on an outer periphery of the cylindrical member, a longitudinal through-hole 143, and a plurality of pairs of ribs 144 formed on an outer periphery of the cylindrical member. When engaging the sleeve 14 with the engaging member 2, the base portion 141 of the sleeve 14 presses the retainer 52 against the stepped portion 25. The respective block 142 of the sleeve 14 is engaged in a respective gap between two adjacent legs 22 of the engaging member 2, preventing the sleeve 14 from rotating relative to the engaging member 2. The shaft 51 of the rotor 5 extends through the longitudinal through-hole 143 of the sleeve 14. When the sleeve 14 and the engaging member 2 are received in the axial tube 11, the respective protrusion 13 of the axial tube 11 is sandwiched between a respective pair of the ribs 144 of the sleeve 14. Mounted in the sleeve 14 is a bearing 4 through which the shaft 51 of a rotor 5 extends. The bearing 4 is preferably an oily bearing, self-lubricating bearing, copper bearing, or a sintered bearing. The bearing 4 has a central hole 41 and a plurality of oil channels 42 defined in an outer periphery of the bearing 4, allowing circulation of the lubricating oil.

Figure 4:
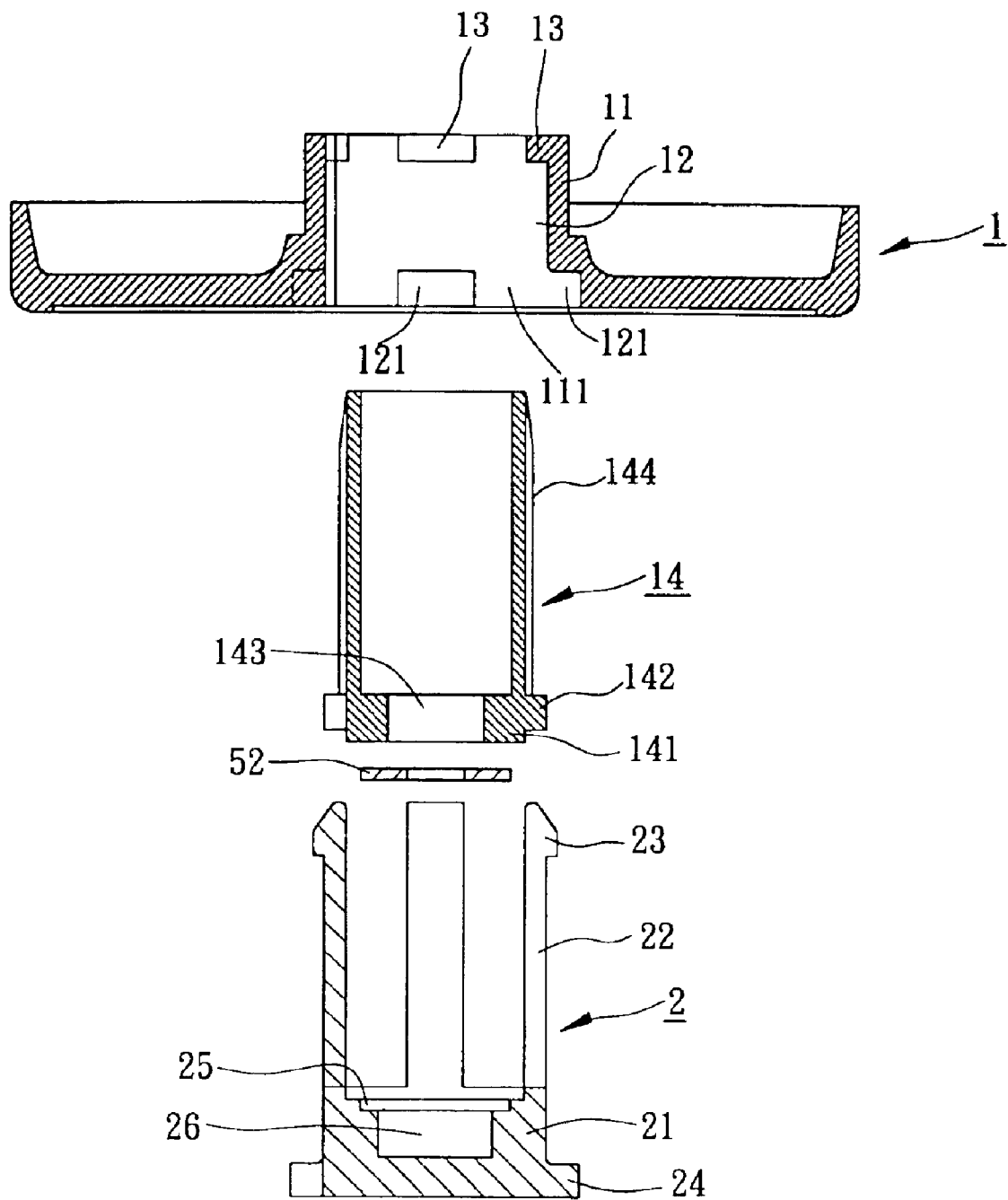
FIG. 4 is an exploded sectional view of the axial tube assembly in accordance with the present invention.
Figure 5:
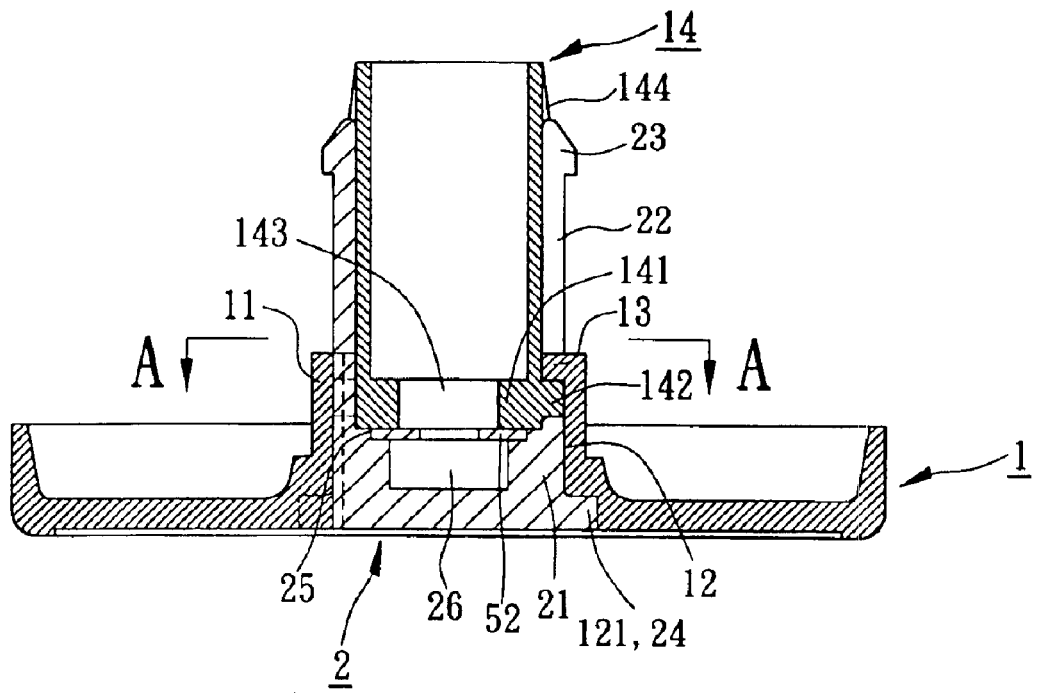
FIG. 5 is a sectional view of the axial tube assembly.
Figure 6:
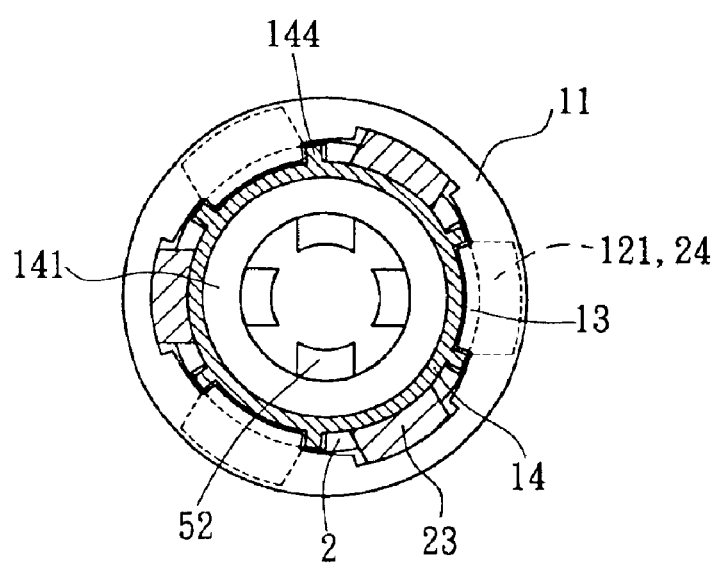
FIG. 6 is a sectional view taken along line A—A in FIG. 5.

As illustrated in FIGS. 4 through 6, in assembly, the sleeve 14 and the retainer 52 are firstly mounted in the engaging member 2. Then, the sleeve 14 and the engaging member 2 are mounted into the axial tube 11. Thus, the retainer 52 is retained between the stepped portion 25 of the engaging member 2 and the base portion 141 of the sleeve 14. The blocks 142 of the sleeve 14 retain the legs 22 of the engaging member 2 in place, and the ribs 144 of the sleeve 14 retain the blocks 13 of the axial tube 11 in place, preventing relative rotation between the sleeve 14 and the engaging member 2. Further, the legs 22 of the engaging member 2 are engaged with the grooves 12 of the engaging member 2, and the positioning blocks 24 of the engaging member 2 are engaged with the positioning grooves 121 of the axial tube 11, thereby providing a reliable assembly between the axial tube 11 and the engaging member 2. The protrusions 13 of the axial tube 11 abut against the block 142 of the sleeve 14, preventing the sleeve 14 from moving upward and thus disengaging from the axial tube 11.

Figure 7:
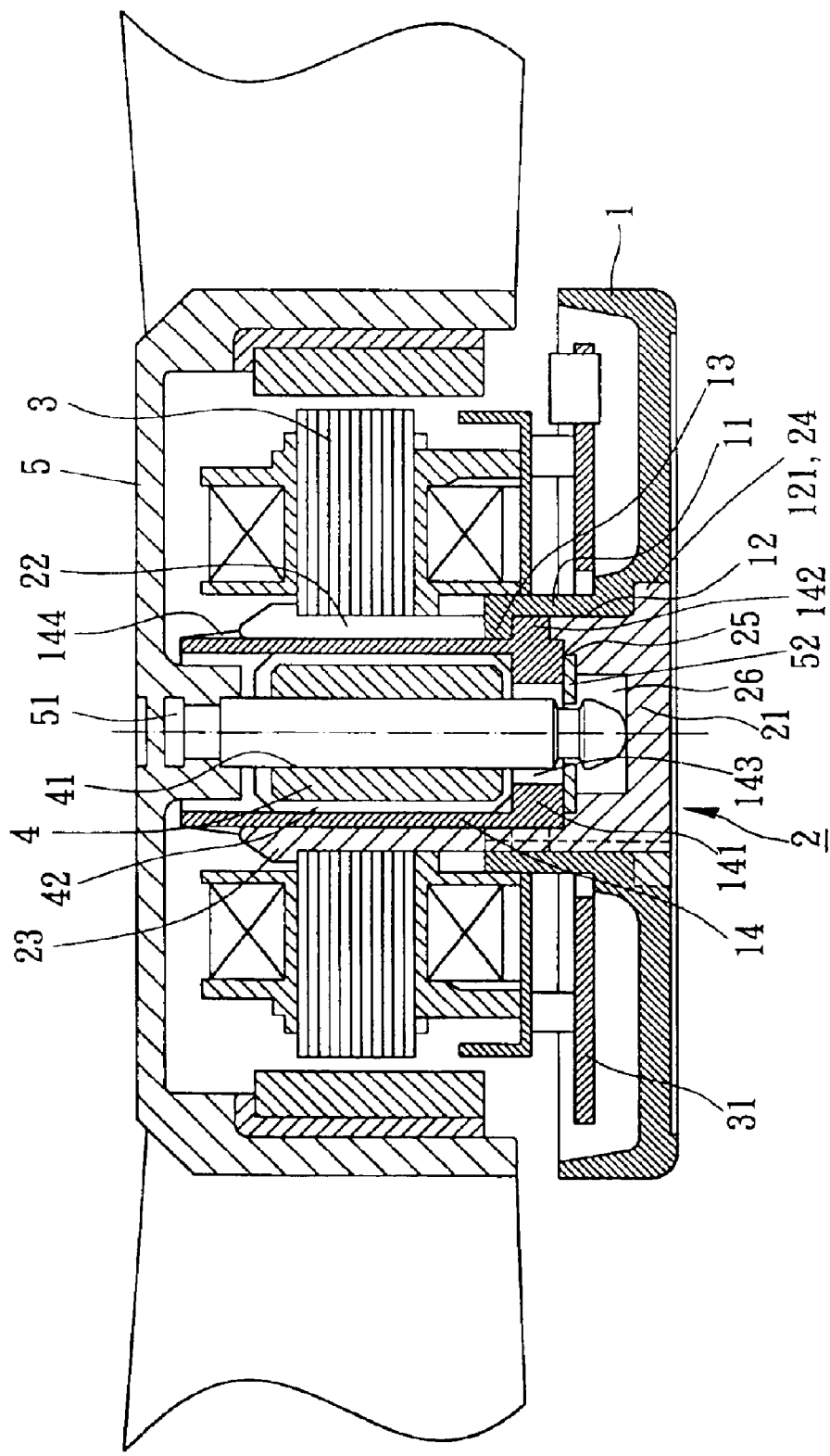
FIG. 7 is a sectional view of the motor in accordance with the present invention.

Next, as illustrated in FIG. 7, the circuit board 31 and the stator assembly 3 are mounted around the axial tube 11, with the hook 23 on the respective leg 22 of the engaging member 2 hooking on a side (top side in FIG. 7) of the stator assembly 3 when the respective leg 22 returns to its original position after the stator assembly 3 has passed through the hooks 23. Next, the bearing 4 is forcibly inserted into the sleeve 14, in which the sleeve 14 is expanded radially outward by the bearing 4, allowing intimate contact between the sleeve 14 and the bearing 4. Thus, the stator assembly 3 outside the axial tube 11 as well as the sleeve 14 and the bearing 4 inside the axial tube 11 are positioned to the optimal condition. Then, the shaft 51 of the rotor 5 is extended through the central hole 41 of the bearing 4 and the retainer 52, thereby positioning the shaft 51, with a distal end of the shaft 51 resting on a bottom wall of the engaging member 2 that delimits the reservoir 26. As a result, the motor (a miniature brushless D.C. motor in this case) in accordance with the present invention provides a tight engagement between the sleeve 14 and the bearing 4. The mounting of the retainer 52 is simplified. The bearing 4 is provided with a reservoir 26 and circulating paths (see the oil channels 42). The rotating stability of the rotor 5 is improved, the noise resulting from imbalanced rotation of the rotor 5 is avoided, and the life of the motor is prolonged. Further, the upper end of the sleeve 14 may be extended to a position adjacent to an end wall of the rotor 5 to reduce the gap between the upper end of the sleeve 14 and the end wall of the rotor 5, thereby reducing the risk of entrance of dust into the bearing 4.

According to the above description, it is appreciated that the disadvantages of the conventional axial tube assembly are mitigated and/or obviated by the axial tube assembly in accordance with the present invention. In particular, a reliable assembly is provided, the life of the bearing is prolonged, the assembling procedure is simplified, and the rotating stability and rotating balance of the rotor are improved. Further, the miniature brushless D.C. motor thus constructed can be used with various bearings, such as oily bearings, self-lubricating bearings, copper bearings, sintered bearings, etc.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. An axial tube assembly of a motor, comprising:

an axial tube including an axial hole, a stator assembly being adapted to be mounted around said axial tube;

an engaging member including a base and a plurality of resilient legs projecting from said base, each said resilient leg having a hook on a distal end thereof, said base of said engaging member being engaged with and thus sealing a bottom end of said axial hole of said axial tube; and a sleeve mounted in said engaging member, a bearing being adapted to be mounted in said sleeve, said sleeve including a base portion;

said hook of each said resilient leg of said engaging member being pressed outward to thereby retain said stator assembly in place when said sleeve and said engaging member are received in said axial tube, with said resilient legs of said engaging member together holding said sleeve to thereby allow tight engagement between said sleeve and said bearing.

2. The axial tube assembly of a motor as claimed in claim 1, wherein said axial tube includes a plurality of grooves in an inner periphery delimiting said axial hole, said resilient legs of said engaging member being respectively positioned in said grooves of said axial tube.

3. The axial tube assembly of a motor as claimed in claim 1, wherein said sleeve further includes a plurality of blocks, each two adjacent resilient legs of said engaging member having a gap therebetween, each said block of said sleeve being positioned in a respective gap, thereby preventing relative rotation between said sleeve and said engaging member.

4. The axial tube assembly of a motor as claimed in claim 1, wherein said sleeve has an upper end extending to a position adjacent to an end wall of a rotor, preventing entrance of dust via a gap between said end wall of said rotor and said upper end of said sleeve.

5. The axial tube assembly of a motor as claimed in claim 1, wherein said axial tube further includes a plurality of positioning grooves in a bottom end delimiting the axial hole, said base of said engaging member further including a plurality of positioning blocks for engaging with said positioning grooves of said axial tube.

6. The axial tube assembly of a motor as claimed in claim 1, wherein said axial tube further includes a plurality of protrusions on an upper end of an inner periphery delimiting said axial hole for preventing said sleeve from disengaging from said axial tube.

7. The axial tube assembly of a motor as claimed in claim 6, wherein said sleeve includes a plurality of pairs of ribs on an outer periphery thereof, each said protrusion of said axial tube being sandwiched between a respective pair of said ribs of said sleeve.

8. The axial tube assembly of a motor as claimed in claim 1, further including a retainer sandwiched between said base portion of said sleeve and said base of said engaging member, thereby positioning a shaft of a rotor that extends through the bearing.

9. The axial tube assembly of a motor as claimed in claim 8, wherein said base of said engaging member includes a stepped portion on an upper end thereof, and wherein said retainer is positioned on said stepped portion.

10. The axial tube assembly of a motor as claimed in claim 1, wherein said bearing is one of an oily bearing, a self-lubricating bearing, a copper bearing, and a sintered bearing.

11. The axial tube assembly of a motor as claimed in claim 1, wherein said bearing further includes a plurality of oil channels in an outer periphery thereof.

* * * * *